US008549282B2

United States Patent
Sabo et al.

(10) Patent No.: US 8,549,282 B2
(45) Date of Patent: Oct. 1, 2013

(54) METHOD AND SYSTEM FOR MONITORING ENCRYPTED DATA TRANSMISSIONS

(75) Inventors: Dale Sabo, Manotick (CA); Gerrard Eric Rosenquist, Kanata (CA)

(73) Assignee: Trend Micro Incorporated, Tokyo (JP)

( * ) Notice: Subject to any disclaimer, the term of this patent is extended or adjusted under 35 U.S.C. 154(b) by 1658 days.

(21) Appl. No.: 11/766,976

(22) Filed: Jun. 22, 2007

(65) Prior Publication Data

US 2008/0320297 A1    Dec. 25, 2008

(51) Int. Cl.
*G06F 21/00*    (2013.01)

(52) U.S. Cl.
USPC ............... 713/152; 726/4; 726/14; 726/34; 713/151; 713/160; 380/229; 709/231; 705/67

(58) Field of Classification Search
USPC .......................................... 713/152, 168, 153
See application file for complete search history.

(56) References Cited

U.S. PATENT DOCUMENTS

| | | | |
|---|---|---|---|
| 5,584,023 A * | 12/1996 | Hsu ........................................ 1/1 |
| 6,981,140 B1 * | 12/2005 | Choo ............................ 713/164 |
| 7,634,650 B1 * | 12/2009 | Shah et al. ..................... 713/150 |
| 2003/0105952 A1 * | 6/2003 | Brabson et al. ............... 713/151 |
| 2003/0105957 A1 * | 6/2003 | Brabson et al. ............... 713/164 |
| 2004/0073792 A1 * | 4/2004 | Noble et al. .................... 713/168 |
| 2004/0139317 A1 * | 7/2004 | Fronberg ........................ 713/164 |
| 2005/0273850 A1 * | 12/2005 | Freund ............................. 726/14 |
| 2006/0161921 A1 * | 7/2006 | Kissell ............................ 718/102 |
| 2006/0190719 A1 * | 8/2006 | Rao et al. ........................ 713/160 |
| 2006/0248581 A1 * | 11/2006 | Sundarrajan et al. ............ 726/12 |
| 2008/0046558 A1 * | 2/2008 | Raja et al. ...................... 709/224 |
| 2008/0046727 A1 * | 2/2008 | Kanekar et al. ................ 713/168 |
| 2008/0098215 A1 * | 4/2008 | Belgaied et al. ............... 713/160 |
| 2008/0147915 A1 * | 6/2008 | Kleymenov ...................... 710/52 |
| 2008/0235508 A1 * | 9/2008 | Ran et al. ........................ 713/151 |

OTHER PUBLICATIONS

Dierks, T. and Rescorla E. "The Transport Layer (TLS) Protocol" RFC4346, version 1.1, Apr. 2006, pp. 1-78.

* cited by examiner

*Primary Examiner* — Morshed Mehedi
(74) *Attorney, Agent, or Firm* — IP-MEX Inc.; Victoria Donnelly (57) ABSTRACT

A method for efficiently decrypting asymmetric SSL pre-master keys is divided into a key agent component that runs in user mode, and an SSL driver running in kernel mode. The key agent can take advantage of multiple threads for decoding keys in a multi-processor environment, while the SSL driver handles the task of symmetric decryption of the SSL encrypted data stream. The method is of advantage in applications such as firewalls with deep packet inspection in which all encrypted data traffic passing through the firewall must be decrypted for inspection.

18 Claims, 6 Drawing Sheets

METHOD AND SYSTEM FOR MONITORING ENCRYPTED DATA TRANSMISSIONS

FIELD OF THE INVENTION

The present invention relates to the decryption of encrypted data packets, specifically for the purpose of monitoring the packet payload contents.

BACKGROUND OF THE INVENTION

The encryption of data that is transmitted through the Internet has become common place. Data messages may be encoded by a protocol known as SSL (Secure Socket Layer) which is intended to render the encoded data unintelligible to any recipient or eavesdropper, unless they are in possession of the key (decryption key) necessary for decoding the data. SSL was developed by Netscape Communications Corporation for securing data transmission in commercial transactions on the Internet. Using public-key cryptography, SSL provides server authentication, data encryption, and data integrity for client/server communications.

The SSL protocol has evolved over the years, and has become standardized, the term "SSL" being generally used to refer to any version of the protocol. The specification of a recent version of SSL may be found in the IETF (Internet Engineering Task Force) document RFC (Request For Comment) 4346, entitled "The Transport Layer Security (TLS) Protocol Version 1.1" [1]. The TLS protocol is thus a recent specification of the SSL protocol.

Briefly, the SSL includes a handshake protocol for setting up an encrypted session, methods for the authentication of messages, and methods for encrypting/decrypting the data.

The Internet also has become a place over which unwanted, potentially harmful, and otherwise unsolicited data traffic is transmitted. This phenomenon has given rise to an industry providing various tools for "defending" networks, servers and computer work stations against such traffic, while allowing legitimate traffic to pass unhindered. A "firewall" is typically software that is installed in a network node; traffic passing through a firewall is inspected by inspecting each packet and applying a set of rules to determine whether the packet should pass or be stopped. A firewall may be implemented in a networked computer such as a server or a work station, as well as in dedicated nodes such as network access nodes and routers.

The functionality of a firewall may range from simple address filtering in which packets with predetermined source addresses or ranges of addresses are discarded, to more complex processes which include: discriminating traffic on the basis of the protocol, for example ICMP (Internet Control Message Protocol), UDP (User Datagram Protocol), TCP (Transmission Control Protocol), etc; filtering based on source and destination ports of each packet; tracking the connection state to determine protocol violations; and the like. Even more sophisticated filtering may be done on the basis of the message content itself, so called "deep" packet inspection.

An added complication arises when the firewall is also required to guard against, and identify for discarding, unwanted messages that are encrypted. In the case of a network node that is flooded with a large amount of unwanted messages that are encrypted, it is very important to ensure that the filtering of such messages is performed efficiently and expeditiously. When deep packet inspection is required, each session comprising a stream of ultimately perhaps unwanted packets must first be set up according to the specified protocol, and packets decrypted correctly before a decision regarding the session's validity can be made.

While the specification, as well as much of the necessary software to handle SSL, are publicly available, the existing software is designed to deal with the traditional case of server to client communication, but is inadequate to process unwanted traffic efficiently enough to be used in a firewall that includes deep packet inspection.

Consequently there is a need for the development of improved techniques to efficiently enable monitoring the packet payload contents of encrypted data traffic, for example, for the purpose of monitoring and filtering of unwanted data traffic.

SUMMARY OF THE INVENTION

It is therefore an objective of the invention to develop a method and system that can be used to enable the decryption of encrypted data packets, specifically for the purpose of monitoring the packet payload contents.

According to one aspect of the invention there is provided a method for decrypting a Secure Socket Layer (SSL) pre-master key in a computing environment having a user mode and a kernel mode, comprising steps of:
  (a) sending an asymmetric encrypted pre-master key from a driver running in kernel mode to a key agent running in user mode;
  (b) decrypting the pre-master key in the key agent; and
  (c) returning the decrypted pre-master key to the driver.
The step (a) of the method comprises:
  placing the asymmetric encrypted pre-master key in a decryption request record in a decryption request queue in the driver; and
  reading the decryption request record from the decryption request queue in the driver and placing it in an agent request queue in the key agent.
The step (b) of the method comprises:
  (i) removing the decryption request record from the agent request queue;
  (ii) passing said decryption request record to a key decryption thread in the key agent; and
  (iii) decrypting the pre-master key with a private key in the key decryption thread.
In the embodiment of the invention, the steps (ii) and (iii) of the method comprise selecting one of a plurality of key decryption threads for decrypting different decryption request records.

Conveniently, the step (c) of the method comprises sending an error response to the driver indicating that the agent request queue is full; sending an error response to the driver indicating that the private key is not available; and sending an error response to the driver indicating that the decryption did not succeed.

According to another aspect of the present invention there is provided a method of inspecting an encrypted packet in a computing environment having a user mode and a kernel mode, the method comprising the steps of
  (1) initiating an encrypted session comprising decrypting a Secure Socket Layer (SSL) pre-master key comprising:
    (a) sending an asymmetric encrypted pre-master key from a driver running in kernel mode to a key agent running in user mode;
    (b) decrypting the pre-master key in the key agent; and
    (c) returning the decrypted pre-master key to the driver;
    and in the driver running in the kernel mode:
  (2) generating a master key from the decrypted pre-master key;

(3) decrypting the packet using the master key to obtain a decrypted packet;

(4) inspecting content of the decrypted packet.

The method further comprises the step (5) repeating the steps (3) and (4) until the encrypted session is terminated.

The method further comprises terminating the encrypted session based on the content of the decrypted packets.

According to yet another aspect of the invention there is provided a method of initiating a Secure Socket Layer (SSL) session using a handshake protocol, in a computing environment having a user mode and a kernel mode, the method comprising steps of:

in a driver running in the kernel mode, receiving a SSL ClientKeyExchange message of the handshake protocol including an encrypted pre-master key;

in a key agent running in the user mode, enqueing the encrypted pre-master key in an agent request queue;

in the key agent, decrypting the encrypted pre-master key into a decrypted pre-master key; and sending the decrypted pre-master key to the driver for completing the initiating of the SSL session.

In the method described above, the step of decrypting is performed in one of a plurality of decryption threads of the key agent.

According to one more aspect of the invention there is provided a system for decrypting a Secure Socket Layer (SSL) pre-master key in a computing environment having a user mode and a kernel mode, comprising a memory comprising the following components:

(a) a driver running in kernel mode for sending an asymmetric encrypted pre-master key;

(b) a key agent running in user mode for receiving and decrypting the pre-master key in the key agent, including means for returning the decrypted pre-master key to the driver.

In the system described above, the driver comprises:

a decryption request queue for holding the asymmetric encrypted pre-master key in a decryption request record; and the key agent further comprises a decryption request reader thread and an agent request queue, the decryption request reader thread for reading the decryption request record from the decryption request queue and placing it in the agent request queue.

In the system described above, the key agent further comprises:

one or more key decryption threads for removing the decryption request record from the agent request queue and decrypting the pre-master key with a private key.

According to one more aspect of the invention there is provided a system for inspecting an encrypted packet in a computing environment having a user mode and a kernel mode, the system comprising a memory including:

(1) means for initiating an encrypted session comprising decrypting a Secure Socket Layer (SSL) pre-master key, the means comprising:

(a) a driver running in the kernel mode and a key agent running in the user mode, the driver for sending an asymmetric encrypted pre-master key to the key agent;

(b) one or more key decryption threads in the key agent for decrypting the pre-master key in the key agent into a decrypted pre-master key; and (c) a passive SSL engine in the driver for receiving the decrypted pre-master key from the key agent;

the passive SSL engine further comprising means for:

generating a master key from the decrypted pre-master key;

decrypting the packet using the master key to obtain a decrypted packet;

inspecting content of the decrypted packet.

The passive SSL engine further comprises means for continuing to decrypt packets and to inspect the decrypted packets until the encrypted session is terminated.

The system further comprises means for terminating the encrypted session based on the content of the decrypted packets.

According to yet one more aspect of the present invention, there is provided a system for initiating a Secure Socket Layer (SSL) session using a handshake protocol, in a computing environment having a user mode and a kernel mode, the system comprising a memory including:

a driver running in the kernel mode for receiving a SSLClientKeyExchange message of the handshake protocol including an encrypted pre-master key;

an agent request queue in the user mode for enqueing the encrypted pre-master key;

one or more key decryption threads running in the user mode for dequeuing the encrypted pre-master key and decrypting the encrypted pre-master key into a decrypted pre-master key; and means in the driver for receiving the decrypted pre-master key for completing the initiating of the SSL session.

BRIEF DESCRIPTION OF THE DRAWINGS

An embodiment of the invention will now be described, by way of example, with reference to the accompanying drawings in which.

DETAILED DESCRIPTION OF THE EMBODIMENTS OF THE INVENTION

The progress of a typical SSL session may be divided into two phases, a handshake phase for setting up the session, and a stream decryption phase. In the handshake phase, public key technology is used to derive secret session keys to be used in the decryption of the encrypted SSL data streams.

The cryptographic operations that deal with the public keys will be referred to collectively as "asymmetric cryptographic operations" because their efficacy is based on the public key premise under which it is "easy" to encrypt data using the public key, but for all practical purposes impossible to decrypt unless one has the private key. The computational effort to perform the asymmetrical cryptographic operations is high due to the use of very large keys which are typically 128 of bytes or larger. Because the asymmetrical cryptographic operations are only used in setting up a cryptographic SSL session, the computational expense is normally accepted, but even so, hardware accelerators and key stores are sometimes used to offload the central processor.

A purpose of the SSL handshake phase is for the two ends of the connection, that is a client and a server, to negotiate a secret pre-master key. From the pre-master, a master key (a "master secret" in the terminology of [1]) is derived with which the subsequent SSL data stream is encoded at one end of the connection and decoded at the other. The same key is used in both operations, which are referred as "symmetric cryptographic operations". The pre-master key and the master key are typically much shorter, than the public keys, and the symmetric cryptographic operations are very efficiently performed by modern processors.

Network protocol operations are commonly performed by the kernel of modern operating systems that follow the UNIX™ model, such as Linux™, Mac™ OCX (Object Linking and Embedding Control Extension), and Windows™. The kernel is generally reliable and handles hardware/software interactions, such as network interfaces. It communicates with application software that normally runs in user space, through software interfaces or APIs (Application Process Interface). Some kernel modules are also referred to as "drivers", with a simple API or an Input/Output Control Interface (IOCTL). Relevant to the present discussion is the fact that context switching between user processes and kernel processes is time consuming, and to allow responsive multi-process operation of the computer system, no process can be allowed to run uninterruptedly for long periods of time.

Figure 1:
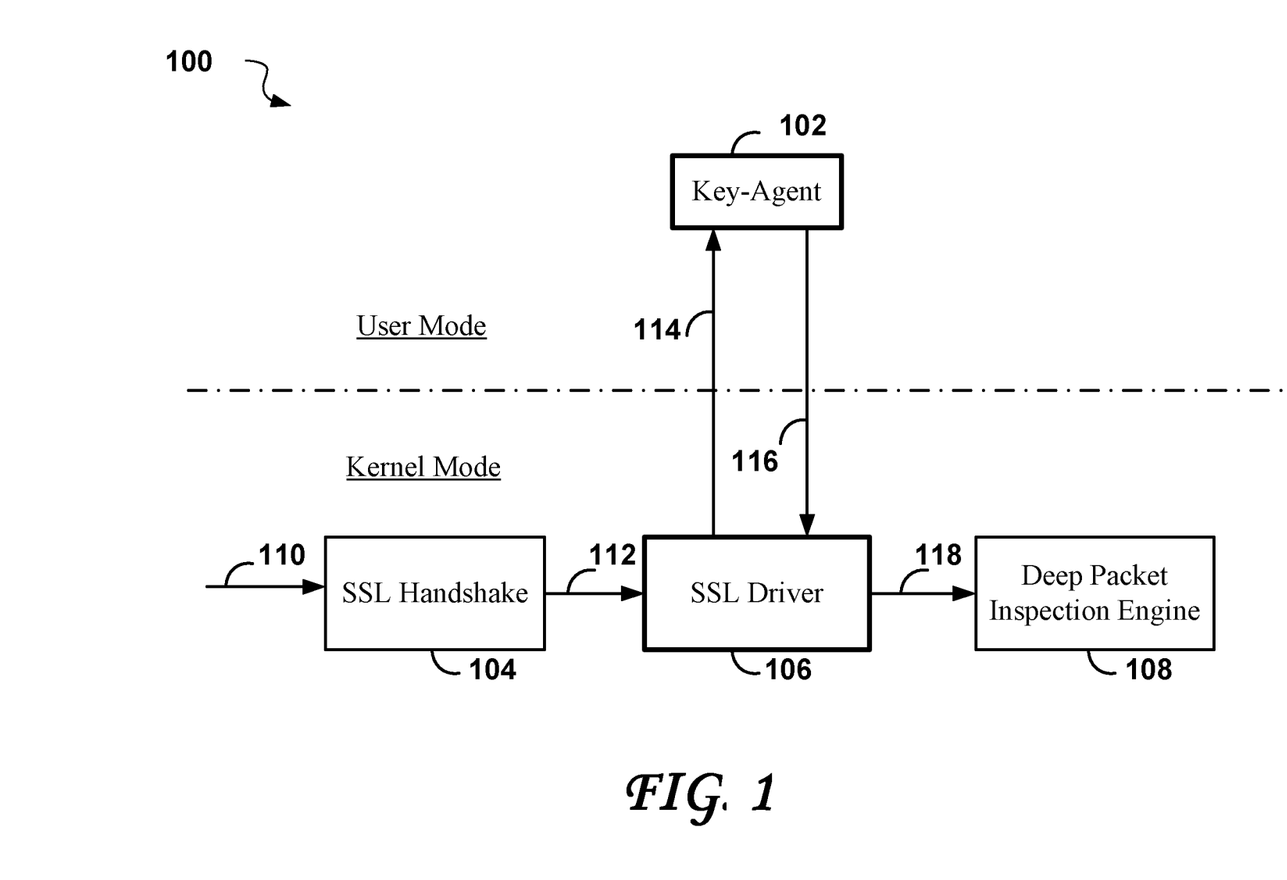
FIG. 1 shows a simplified view of a software package 100 according to an embodiment of the invention.

FIG. 1 shows a simplified view of a software package 100 according to an embodiment of the invention. The software package 100 is divided into software functions running in "User Mode", and software functions running in "Kernel Mode". The software package 100 includes a "Key Agent" 102 which runs in "User Mode", and it further includes a "SSL Handshake" 104; a "SSL Driver" 106; and a "Deep Packet Inspection Engine" 108, all of which run in "Kernel Mode".

All, much, or only some of the data to be processed by the "Deep Packet Inspection Engine" 108 may be in the form of encrypted SSL data streams, but only encrypted packets are of interest here. Packets arriving from a network interface 110 are passed into the "SSL Handshake" 104 which performs the standard SSL handshake protocol to initiate an encrypted session. The "SSL Driver" 106 participates in the SSL handshake by receiving key requests 112 and passing asymmetric encrypted pre-master keys 114 to the "Key Agent" 102. The "Key Agent" 102 performs the compute-intensive operations that are required to decrypt each asymmetric encrypted pre-master key 114 and sends a corresponding decrypted pre-master key 116 back to the "SSL Driver" 106. The "SSL Driver" 106 then generates a secret master key 118 from the decrypted pre-master key 116 according to the standard specification, and sends the secret master key 118 to the "Deep Packet Inspection Engine" 108. Details of the SSL handshake including key exchanges are described in the RFC 4346 cited above, only a cursory description being offered here for convenience.

Encrypted SSL data streams are then passed to the "Deep Packet Inspection Engine" 108 where they may be decrypted using the secret master key 118 in a standard manner, for analysis including deep packet inspection, in the same way as other (non-SSL) data streams would be analyzed.

With the "Deep Packet Inspection Engine" 108 and other functionality (not shown) the software package 100 provides firewall functions such as intrusion detection, including the capability that encrypted data streams be decrypted for inspection before either suppressing or passing the encrypted data stream on to the intended recipient, for example, an HTML server or client application on the same host, or to a local network.

The embodiment of the invention provides offloading the kernel mode from the asymmetric cryptographic operations that are required for deriving secret SSL master keys to be used in the decryption and subsequent inspection of encrypted SSL data streams, as well as the design of the kernel mode driver.

The passive SSL decryption of data streams requires symmetric cryptographic keys, i.e. the master keys that are derived using pre-master keys, which, in turn, are generated with asymmetric cryptographic methods. For reasons such as code size, lengthy decryption times, possible support of third party hardware acceleration, and key stores, in the embodiment of the present invention the asymmetric part of the process is implemented as a user mode software process in the form of the "Key Agent" 102, coupled to the "SSL Driver" 106 that is implemented as a kernel mode software process.

Asymmetric decryption is a computationally heavy process that is not well suited for implementation within an operating system kernel mode driver for the following reasons:

depending upon the key size it was encrypted with, the decryption of encrypted key information could render the operating system unresponsive for an unacceptable number of machine cycles if it was implemented in the kernel; and there exist many third party hardware based asymmetric cryptographic accelerators, private key stores accessible via the Cryptographic Application Programming Interface (CAPI), and third party hardware tokens or "dongles" which would not be accessible from a kernel mode driver.

Thus, in the present the invention the asymmetric decryption operations are implemented as a user mode software component (the "Key Agent" 102), and the symmetric decryption operations are implemented in an operating system kernel mode driver (the "SSL Driver" 106).

This requires that the asymmetrically encrypted key information (i.e. the asymmetric encrypted pre-master key 114) is communicated from the kernel mode driver to the user mode software component, and the decrypted key information (i.e. the decrypted pre-master key 116) is communicated back from the user mode component (i.e. the "Key Agent" 102) to the kernel mode driver (i.e. the "SSL Driver" 106).

In this way it is possible to take advantage of facilities such as threading, concurrency, and preemptive symmetric multi-processing (SMP) processing that are available in the user mode of operating systems.

Although the software package 100 (the Third Brigade "Deep Security Agent" software package) includes of a number of components, only the kernel mode driver (the "SSL Driver" 106) and the user mode agent (the "Key Agent" 102) and the interaction therebetween are directly of interest with respect to the present invention.

Roles of the "SSL Driver" 106 include intercepting network traffic at the network transport layer, modifying, inserting, and deleting packets at its discretion based upon well defined rules, thus implementing a network security device.

As indicated earlier, a common method of protecting network data transmitted between hosts is to encrypt the data via the SSL protocol (RFC 4346) at the application layer. In contrast, in order to secure a host against unwanted network intrusion, the Driver component must be able to analyze the raw or unencrypted form of the data.

The "SSL Driver" 106 implements a Passive SSL Engine, which besides ensuring the validity of the SSL protocol, is also used to decrypt the SSL traffic stream for analysis by the Payload Engine in the "Deep Packet Inspection Engine" 108. The deep packet inspection is the reason why SSL decryption is required.

Figure 2:
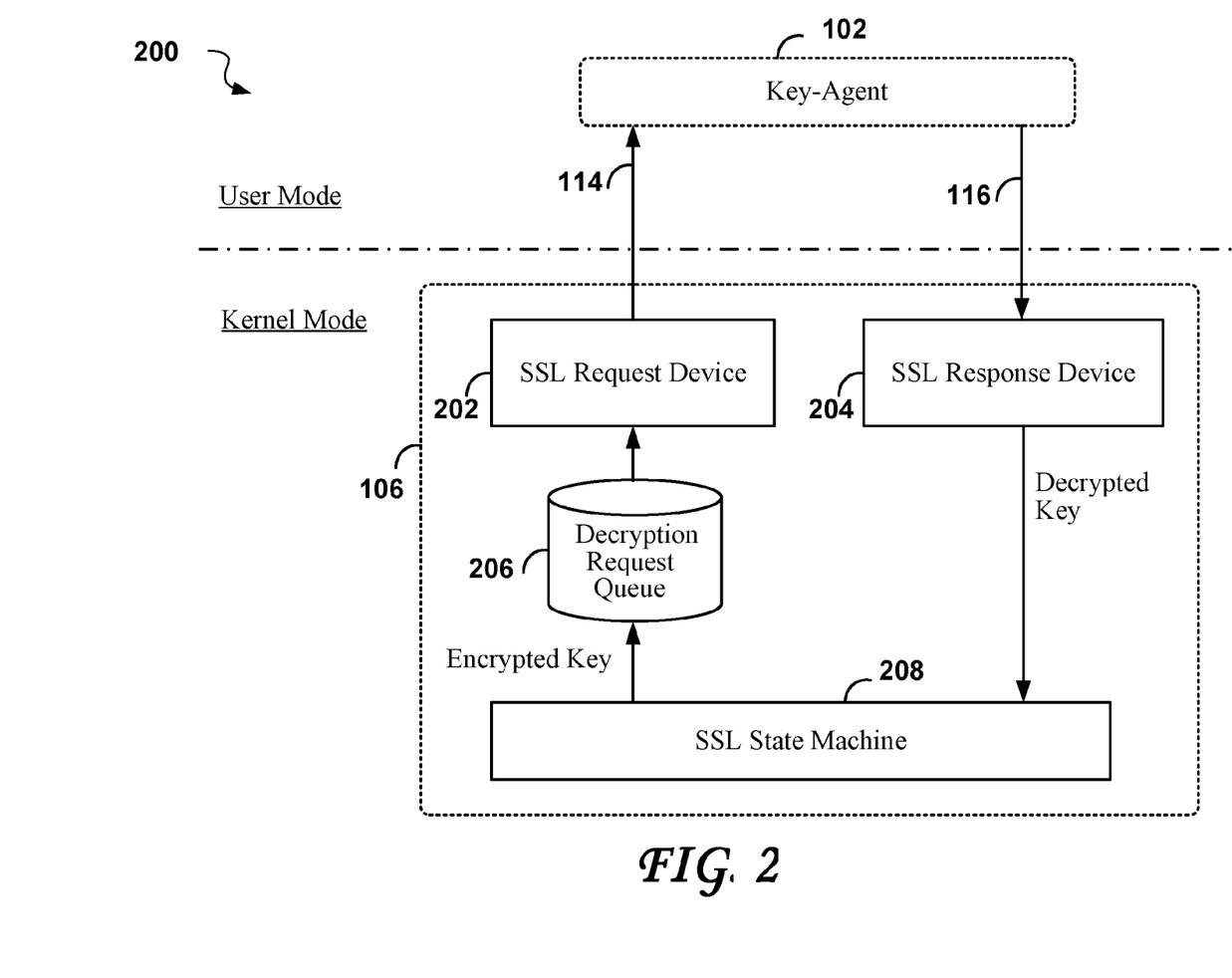
FIG. 2 shows an expanded block diagram 200 including the "Key Agent" 102 and functional components of the "SSL Driver" 106 of the software package 100 of FIG. 1.

FIG. 2 shows an expanded block diagram 200 including the "Key Agent" 102 and functional components of the "SSL Driver" 106, that is: a "SSL Request Device" 202; a "SSL Response Device" 204; a "Decryption Request Queue" 206; and a "SSL State Machine" 208.

The "SSL request device" 202 is a virtual device that is dynamically created to be used by the "Key Agent" 102 for acquiring the asymmetric encrypted SSL pre-master key(s) 114; the "SSL Response Device" 204 is a virtual device by which the "Key Agent" 102 communicates the results of the decryption(s), i.e. the decrypted pre-master key 116, back to the "SSL Driver" 106. Virtual devices are commonly known software structures used as a convenience to provide a simple interface between the "Key Agent" 102 and the "SSL Driver" 106.

The "Key Agent" 102 opens, and executes a blocking read on the "SSL request device" 202, unblocking only when the "SSL Driver" 106 inserts one or more encrypted keys into the "Decryption Request Queue" 206 associated with the "SSL request device" 202.

The "SSL State Machine" 208 monitors the traffic stream (implied, not shown in FIG. 2) for SSL protocol messages. When triggered by the "ClientKeyExchange" handshake message of the SSL protocol (see [1] for protocol details), the "SSL State Machine" 208 adds encrypted keys into the "Decryption Request Queue" 206.

The "Key Agent" 102, when unblocked will read one or more encrypted keys from the "Decryption Request Queue" 206 through the "SSL Request Device" 202, i.e. the "asymmetric encrypted pre-master key" 114.

The "Key Agent" 102 will then attempt to decrypt "asymmetric encoded pre-master key" 114, using a provided asymmetric private key, as described in [1]. In both instances of a successful or an unsuccessful decryption of the "asymmetric encrypted pre-master key" 114, the "Key Agent" 102 will send a response, that is either the decrypted pre-master key 116 or an error indicator respectively, into the "SSL Driver" 106 via the "SSL Response Device" 204 which makes the decrypted key available to the "SSL State Machine".

The "Key Agent" 102 obtains asymmetric encrypted pre-master keys 114 from the "SSL Driver" 106. The asymmetric encrypted pre-master keys 114 are contained in data records known as "decryption requests" or "decryption request records". The methods for passing the decryption requests from the "SSL Driver" 106 to the "Key Agent" 102 are described in more detail in the following FIGS. 3, 4, and 5.

Figure 3:
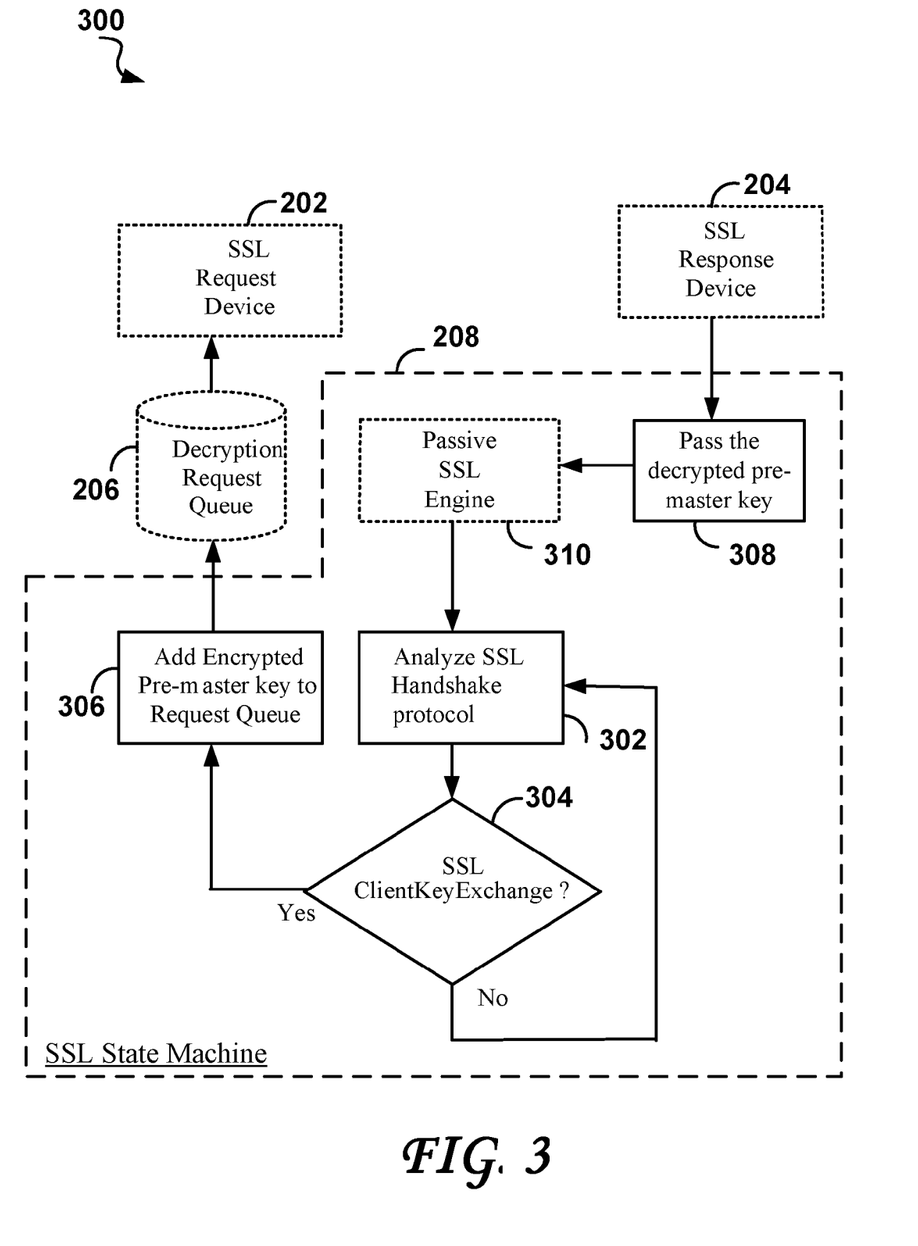
FIG. 3 is a high level driver flow chart 300 including functions of the "SSL State Machine" 208 of the "SSL Driver" 106 of FIG. 2.

FIG. 3 is a high level driver flow chart 300 including functions of the "SSL State Machine" 208 of the "SSL Driver" 106. In addition to the "SSL State Machine" 208, the driver flow chart 300 includes previously described software components of the "SSL Driver" 106, that is the "SSL Request Device" 202; the "SSL Response Device" 204; and the "Decryption Request Queue" 206). The "SSL State Machine" 208 includes functionality to perform steps of:

"Analyze SSL handshake protocol" 302;
"SSL ClientKeyExchange?" 304 (a decision step);
"Add Encrypted Pre-master key to Request Queue" 306; and
"Pass the decrypted pre-master key" 308.

The "SSL State Machine" 208 further includes a "Passive SSL Engine" 310 that includes common SSL protocol and decryption functions that are outside the scope of the invention.

The "Passive SSL Engine" 310 of the "SSL State Machine" 208 monitors the traffic stream for SSL protocol messages and passes such messages to the step 302 "Analyze SSL handshake protocol". Each SSL protocol message is compared with the ClientKeyExchange message type. If it is not a ClientKeyExchange message, as indicated by the decision step 304 "SSL ClientKeyExchange?" determination "No", the analysis of the SSL Handshake protocol continues and loops back to the step 302 "Analyze SSL handshake protocol", otherwise the step 306 "Add Encrypted Pre-master key to Request Queue" is executed which adds the encrypted keys of the ClientKeyExchange message into the "Decryption Request Queue" 206. The encrypted keys (i.e. the asymmetric encrypted pre-master keys) that are queued in the "Decryption Request Queue" 206 are then available to be passed through the "SSL Request Device" 202 to the "Key Agent" 102 as described above. After a successful decryption of the encrypted pre-master keys, the decrypted pre-master key is forwarded from the "Key Agent" 102 to the "SSL State Machine" 208 via the "SSL Response Device" 204, and to the "Passive SSL Engine" 310 in the step "Pass the decrypted pre-master key" 308. Subsequent processing of the decrypted pre-master key in the "Passive SSL Engine" 310 is beyond the scope of the present invention.

Figure 4:
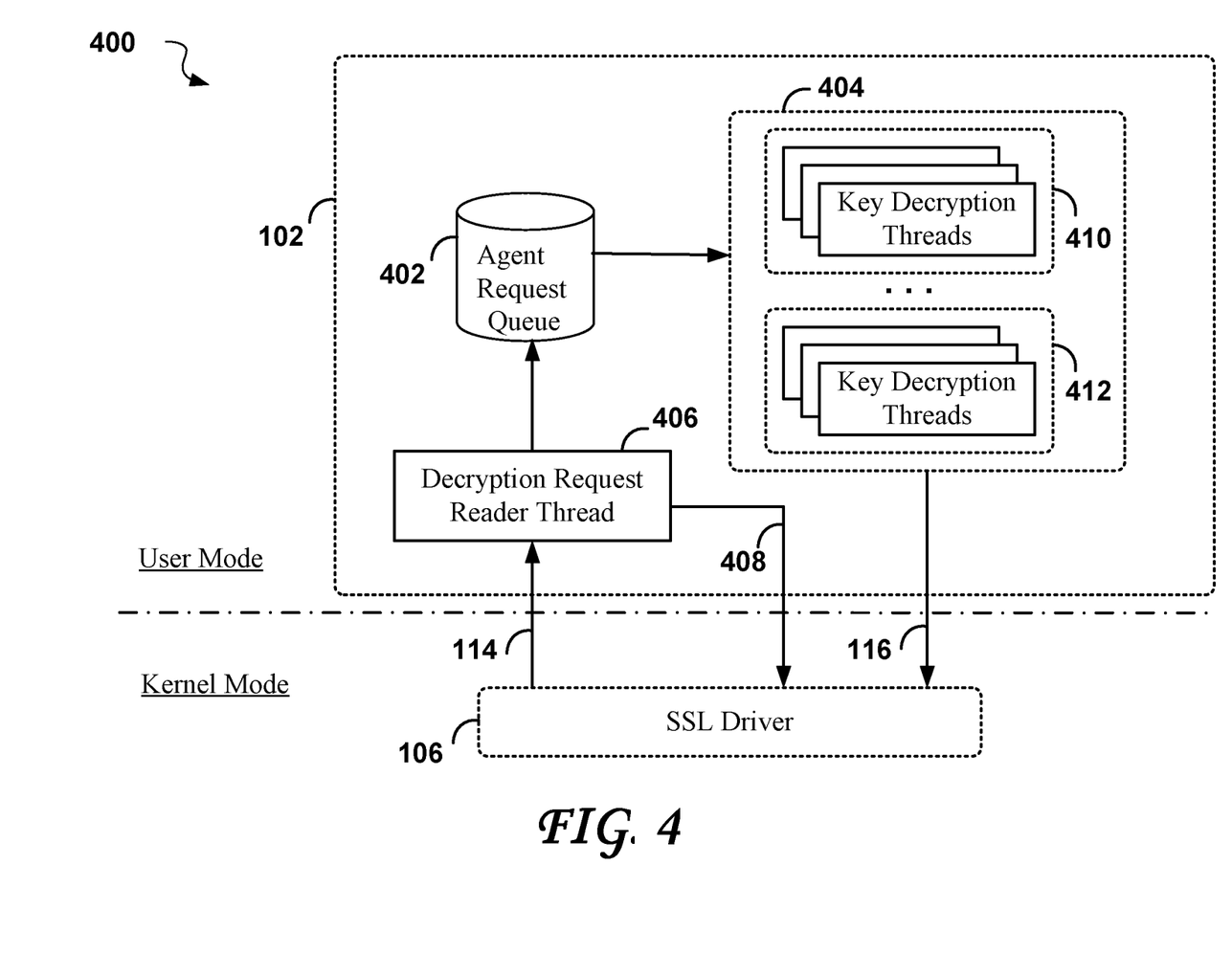
FIG. 4 shows an agent block diagram 400 including the "SSL Driver" 106 that runs in Kernel Mode and functional components of the "Key Agent" 102 running in User Mode.

FIG. 4 shows an agent block diagram 400 including the "SSL Driver" 106 that runs in the Kernel Mode and functional components of the "Key Agent" 102 running in the User Mode, that is: a "Agent Request Queue" 402; a set of "Key Decryption Threads" 404; and a "Decryption Request Reader Thread" 406.

Key decryption requests, i.e. the asymmetric encrypted pre-master keys 114, are passed from the "SSL Driver" 106 to the "Decryption Request Reader Thread" 406 of the "Key Agent" 102. The received encrypted pre-master keys are stored in the "Agent Request Queue" 402 by the "Decryption Request Reader Thread" 406. Concurrently, "Key Decryption Threads" 404 service the "Agent Request Queue" 402, decrypt the pre-master keys, and forward the decrypted pre-master key 116 back to the "SSL Driver" 106. It may be noted that the "Agent Request Queue" 402 has a finite capacity, and it is possible that the queue becomes full because the "Key Agent" 102 may have been preempted by other tasks and not been able to service the queue in time before additional decryption requests arrive. In this case an "Error Response" 408 is transmitted from the "Decryption Request Reader Thread" 406 to the "SSL Driver" 106 to indicate that a request could not be stored. In the preferred embodiment of the invention, the "SSL Driver" 106 then cancels the corresponding attempt to set up an SSL session.

Flow charts of the "Decryption Request Reader Thread" 406 and the "Key Decryption Threads" 404 are shown in the following FIGS. 5 and 6 respectively. The "Key Agent" 102 may operate in a multi-thread environment in order to take advantage of multi-CPU machines and so achieve higher performance than a single-thread design.

Figure 5:
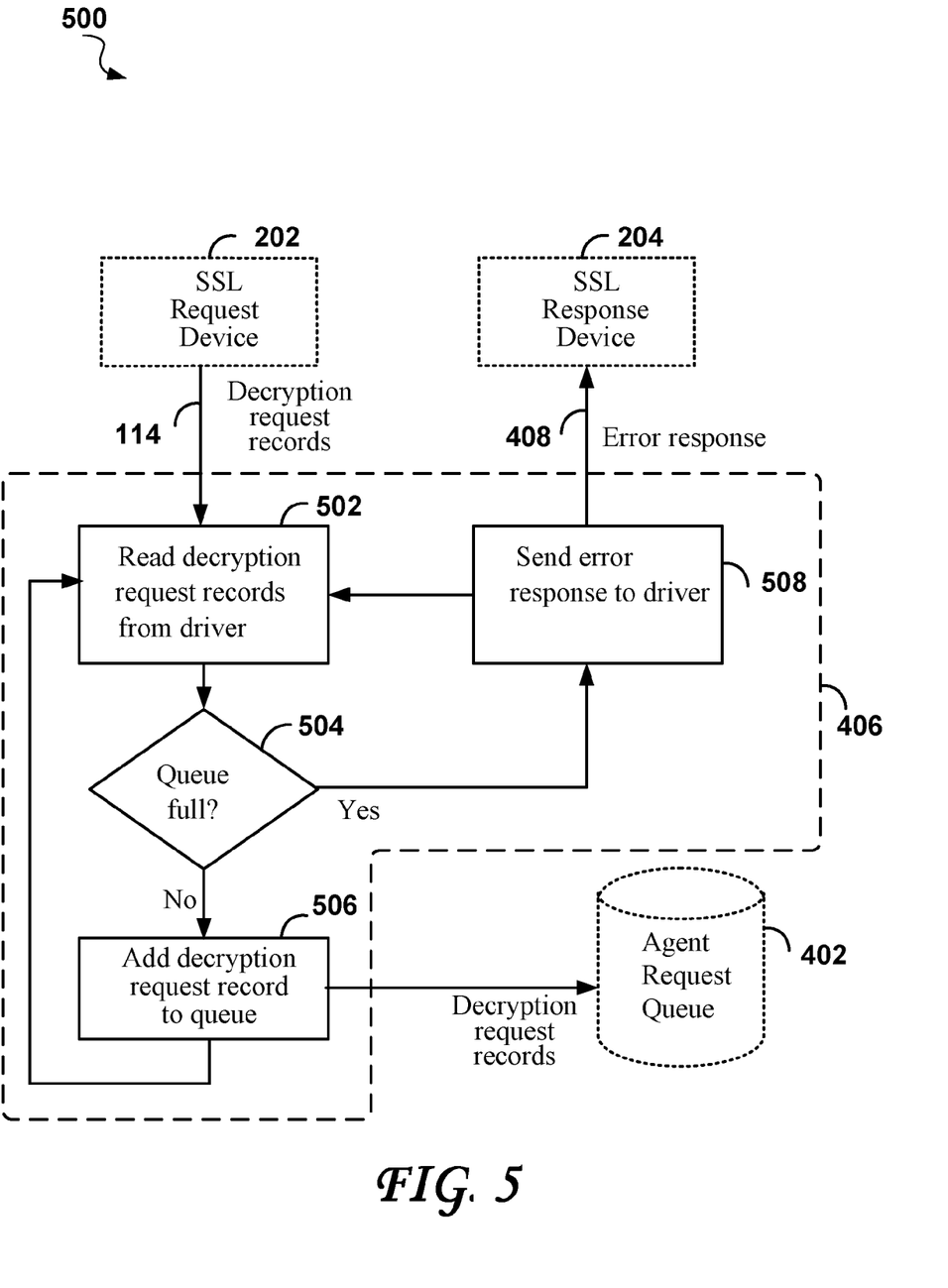
FIG. 5 is a high level request reader thread flow chart 500 illustrating the functionality of the "Decryption Request Reader Thread" 406 of the "Key Agent" 102.

FIG. 5 is a high level request reader thread flow chart 500 illustrating the functionality of the "Decryption Request Reader Thread" 406. In addition to the "Decryption Request Reader Thread" 406, the request reader thread flow chart 500 shows the "SSL Request Device" 202, the "SSL Response Device" 204, and the "Agent Request Queue" 402.

The "Decryption Request Reader Thread" 406 includes functionality to perform steps of:
- 502 "Read decryption request records from driver";
- 504 "Is Queue full?";
- 506 "Add decryption request record to queue"; and
- 508 "Send error response to driver".

The decryption request records which include the asymmetric encrypted pre-master keys 114 are received from the "SSL Request Device" 202 of the "SSL Driver" 106 (FIG. 1), in the step 502 "Read decryption request records from driver". The next step is 504 "Is Queue full?" in which the state of the "Agent Request Queue" 402 is determined. If the queue is full ("Yes" from the step 504 "Is Queue full?"), the step 508 "Send error response to driver" is executed in which the "Error Response" 408 is sent to the "SSL Response Device" 204 of the "SSL Driver" 106, and execution flow returns to the step 502 "Read decryption request records from driver". As long as the queue is full, additional decryption requests continue to be denied, until such time as room becomes available in the queue, i.e. until the "Key Decryption Threads" 404 have serviced the queue and removed at least one decryption request record (see FIG. 6 below).

If the queue is not full ("No" from the step 504 "Is Queue full?"), the step 506 "Add decryption request record to queue" is executed in which the decryption request record obtained in the step 502 "Read decryption request records from driver" is put into the "Agent Request Queue" 402.

Figure 6:
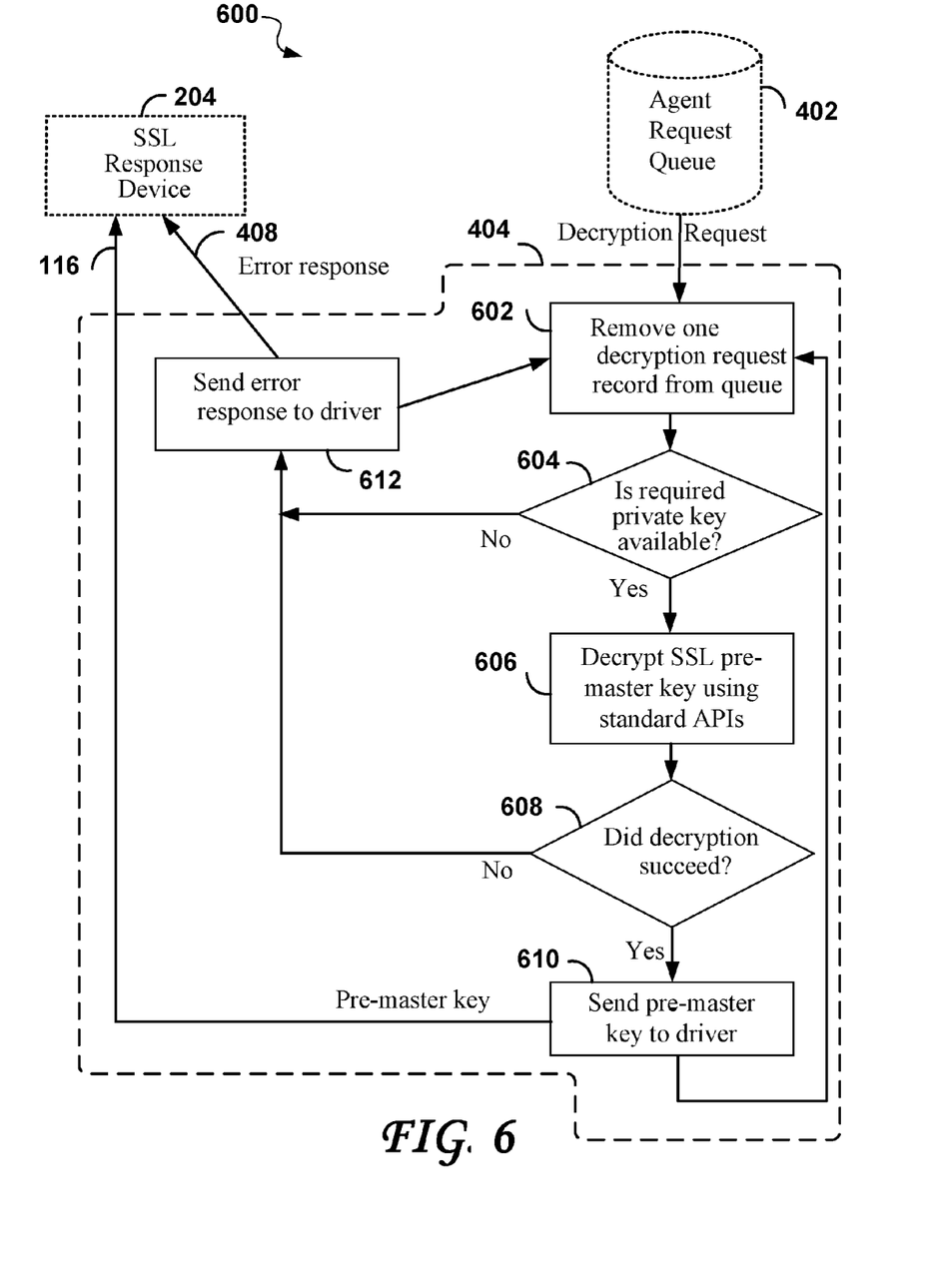
FIG. 6 is a high level decryption thread flow chart 600 illustrating the functionality of one instance of the set of "Key Decryption Threads" 404 of the "Key Agent" 102.

FIG. 6 is a high level decryption thread flow chart 600 illustrating the functionality of one instance of the set of "Key Decryption Threads" 404. In addition to the one of the "Key Decryption Threads" 404, the decryption thread flow chart 600 shows the "SSL Response Device" 204, and the "Agent Request Queue" 402.

The "Key Decryption Thread" 404 includes functionality to perform steps of:
- 602 "Remove one decryption request record from queue";
- 604 "Is private key available?";
- 606 "Decrypt SSL pre-master key using standard APIs";
- 608 "Did decryption succeed?";
- 610 "Send pre-master key to driver"; and
- 612 "Send error response to driver".

Execution of the step 602 "Remove one decryption request record from queue" is performed whenever a decryption request is available in the "Agent Request Queue" 402, otherwise the thread sleeps until it is awakened by the operating system in a standard manner. The methods by which different computer operating systems handle threads vary, and are outside the scope of the present invention. It may be recalled that decryption requests which include encrypted pre-master keys 114 were put into this queue in the step 506 "Add decryption request record to queue" of the "Decryption Request Reader Thread" 406, (FIG. 5).

According to the SSL standard, decryption can only be performed when the appropriate private key is available, see the RFC 4346 cited above. Following removal of the decryption request from the queue in the step 602, a search and determination is made in the following step 605 "Is private key available?". If the required private key is not available (exit "No" from the step 604 "Is private key available?") execution is directed to the step 612 "Send error response to driver" in which the error response 408 is sent to the "SSL Response Device" 204 (in the "SSL Driver" 106, FIG. 1). After the step 612 "Send error response to driver" execution returns to the step 602 "Remove one decryption request record from queue" in which the thread fetches the next decryption request if one is available.

The determination of "Is private key available" may be handled as a configuration issue. In the preferred embodiment of the invention, the agent and driver are configured via user-supplied configuration data which specifies which SSL key to use for a particular TCP port on the local machine.

If the required private key is available (exit "Yes" from the step 604 "Is private key available?") execution continues with the step 606 "Decrypt SSL pre-master key using standard APIs" in which the pre-master key is computed according to standard practice, i.e. by calling routines in a decryption library using standard APIs (Application Programming Interfaces). At this stage, decryption may fail due to any of a number of reasons. In the next step 608 "Did decryption succeed?" such a determination is made. If decryption did not succeed (exit "No" from the step 608 "Did decryption succeed?") execution is directed to the step 612 "Send error response to driver" in which the error response 408 is sent to the "SSL Response Device" 204. If decryption did succeed (exit "Yes" from the step 608 "Did decryption succeed?") execution continues with the step 610 "Send pre-master key to driver" in which the pre-master key 116 is sent to the "SSL Response Device" 204 of the "SSL Driver" 106 (FIG. 1). After the step 610 "Send pre-master key to driver" execution returns to the step 602 "Remove one decryption request record from queue" in which the thread fetches the next decryption request if one is available.

Multiple instances of "Key Decryption Threads" 404 may be active simultaneously to advantage (for example in a multiprocessor host), each thread to take a decryption record off the shared "Agent Request Queue" 402 to decrypt the included asymmetric encrypted pre-master key 114 into the decrypted pre-master key 116 to be sent to the "SSL Response Device" 204, using the steps outlined in the FIG. 6. An advantage of the present invention with multiple instances of "Key Decryption Threads" 404, is due to the fact that the high computational effort to decrypt a pre-master key, an effort that is considerably higher than the comparatively trivial computational effort required to receive and queue the key, can be performed efficiently by threads potentially running in parallel in multiple processors or multiple processor cores.

The system for decrypting a Secure Socket Layer (SSL) pre-master key in a computing environment having a user mode and a kernel mode of the embodiment of the present invention comprises a computer having a computer readable means in the form, for example, of a memory for storing instructions to cause the computer to perform the steps of the methods of the present invention as described above.

The system and methods of the invention have been devised to efficiently handle the computationally expensive decryption of the pre-master keys that are used in the SSL session initiation, thus enabling the subsequent decryption and monitoring of the payload contents of the SSL packet streams.

Although the embodiment of the invention has been described in detail, it will be apparent to one skilled in the art that variations and modifications to the embodiment may be made within the scope of the following claims.

What is claimed is:

1. A method for concurrently decrypting Secure Socket Layer (SSL) pre-master keys of one or more SSL sessions, the method comprising:
   in a computer having a processor, and a user mode and a kernel mode comprising computer readable instructions stored in a computer readable medium for execution by the processor, to perform the following:

establishing said one or more SSL sessions;
sending asymmetric encrypted pre-master keys of each respective SSL session from a driver running in the kernel mode to a key agent running in the user mode, comprising:
placing each asymmetric encrypted pre-master key in a corresponding decryption request record in a decryption request queue in the driver running in the kernel mode; and
reading the decryption request record from the decryption request queue in the driver running in the kernel mode and placing the decryption request record in an agent request queue in the key agent running in the user mode;
decrypting the asymmetric encrypted pre-master keys in multiple key decryption threads in the key agent into corresponding decrypted pre-master keys; and returning the decrypted pre-master keys from the key agent to the driver.

2. The method of claim 1, wherein the decrypting further comprises:
(i) removing one decryption request record from the agent request queue;
(ii) passing said one decryption request record to a selected key decryption thread in the key agent;
(iii) decrypting the pre-master key with a private key in said key decryption thread; and
(iv) repeating steps (i) to (iii) until all pre-master keys are decrypted.

3. The method of claim 2 wherein the steps (ii) and (iii) comprise selecting one of a plurality of key decryption threads for concurrently decrypting different decryption request records.

4. The method of claim 2 wherein the step (c) comprises sending an error response to the driver indicating that the agent request queue is full.

5. The method of claim 2 wherein the step (c) comprises sending an error response to the driver indicating that the private key is not available.

6. The method of claim 2 wherein the step (c) comprises sending an error response to the driver indicating that the decryption did not succeed.

7. A method of inspecting an encrypted packet, comprising:
in a computer having a processor, and a user mode and a kernel mode comprising computer readable instructions stored in a computer readable storage medium for execution by the processor, for performing the following:
(1) establishing a Secure Socket Layer (SSL) session;
(2) decrypting a pre-master key for the SSL session, comprising:
(a) sending an asymmetric encrypted pre-master key from a driver running in the kernel mode to a key agent running in the user mode, comprising:
placing the asymmetric encrypted pre-master key in a decryption request record in a decryption request queue in the driver running in the kernel mode; and
reading the decryption request record from the decryption request queue in the driver running in the kernel mode and placing the decryption request record in an agent request queue in the key agent running in the user mode;
(b) decrypting the pre-master key in one of a plurality of key decryption threads of the key agent; and
(c) returning the decrypted pre-master key to the driver;
in the driver running in the kernel mode:
(3) generating a master key from the decrypted pre-master key;
(4) decrypting the packet using the master key to obtain a decrypted packet; and
(5) inspecting content of the decrypted packet.

8. The method of claim 7 further comprising repeating the steps (4) and (5) until the encrypted session is terminated.

9. The method of claim 8 further comprising terminating the encrypted session based on the content of the decrypted packets.

10. A method of simultaneously initiating first and second Secure Socket Layer (SSL) sessions using a handshake protocol, comprising:
in a computer having a processor, and a user mode and a kernel mode comprising computer readable instructions stored in a computer readable storage medium for execution by the processor, for performing the following:
in a driver running in the kernel mode, receiving first and second SSL ClientKeyExchange messages of the handshake protocol including first and second encrypted pre-master keys;
in the driver, enqueuing said encrypted pre-master keys in a decryption request queue;
in a key agent running in the user mode, acquiring said encrypted pre-master keys through a virtual SSL device interface from the driver;
in the key agent running in the user mode, enqueing the first and second encrypted pre-master keys in an agent request queue;
in the key agent, selecting first and second key decryption threads;
in respective key decryption threads, decrypting said encrypted pre-master keys into first and second decrypted pre-master keys;
sending the decrypted pre-master keys to the driver for completing the initiating of the corresponding SSL sessions;
in the driver, generating respective secret master keys from the decrypted pre-master keys and forwarding the secret master keys for further decrypting data streams of the respective first and second SSL sessions.

11. A system for concurrently decrypting Secure Socket Layer (SSL) pre-master keys of one or more SSL sessions, the system comprising:
a computer having a processor, and a user mode and a kernel mode comprising computer readable instructions stored in a computer readable storage medium for execution by the processor;
the kernel mode comprising:
a driver for sending an asymmetric encrypted pre-master keys of each respective SSL session; the driver comprising a decryption request queue for holding each asymmetric encrypted pre-master key in a corresponding decryption request record; and
the user mode comprising:
a key agent for receiving and decrypting the asymmetric encrypted pre-master keys in multiple key decryption threads into corresponding decrypted pre-master keys;
the key agent, comprising means for returning the decrypted pre-master keys to the driver; the key agent further comprising a decryption request reader thread and an agent request queue, the decryption request reader thread for reading the decryption request record from the decryption request queue and placing the decryption request record in the agent request queue.

12. The system of claim 11 further comprising:
a multiprocessor host or the processor having multiple processor cores adapted for: decrypting the asymmetric encrypted pre-master keys in multiple key decryption threads;
removing corresponding decryption request records from the agent request queue; and
decrypting the pre-master keys with respective private keys.

13. A system for inspecting an encrypted packet, comprising:
a computer having a processor, and a user mode and a kernel mode comprising computer readable instructions stored in a computer readable medium for execution by the processor, forming:
means for initiating an encrypted session comprising decrypting a Secure Socket Layer (SSL) pre-master key in a threaded computing environment, the means comprising:
(a) a driver running in the kernel mode; and
(b) a key agent running in the user mode,
the driver being configured to send an asymmetric encrypted pre-master key to the key agent;
(c) one or more key decryption threads in the key agent for decrypting the pre-master key in one of a plurality of key decryption threads of the key agent into a decrypted pre-master key; and
(d) a passive SSL engine in the driver for receiving the decrypted pre-master key from the key agent;
the passive SSL engine further comprising means for:
generating a master key from the decrypted pre-master key;
decrypting the packet using the master key to obtain a decrypted packet;
inspecting content of the decrypted packet; and
continuing to decrypt packets and to inspect the decrypted packets until the encrypted session is terminated; and
means for terminating the encrypted session based on the content of the decrypted packets.

14. A system for simultaneously initiating first and second Secure Socket Layer (SSL) sessions using a handshake protocol, the system comprising:
a computer device having a processor, and a user mode and a kernel mode comprising computer readable instructions stored in a computer readable storage medium for execution by the processor;
the kernel mode comprising a driver for receiving first and second SSL ClientKeyExchange messages of the handshake protocol, respectively including first and second encrypted pre-master keys, the driver comprising a decryption request queue for enqueuing said encrypted pre-master keys; the driver being configured to generate respective secret master keys from the decrypted pre-master keys and to forward the secret master keys for further decrypting data streams of the respective first and second SSL sessions; and
the user mode comprising a key agent, the key agent comprising:
a decryption request reader thread for acquiring said encrypted pre-master keys through a virtual SSL device interface from the driver;
an agent request queue for enqueing said first and second encrypted pre-master keys in an agent request queue; and
a plurality of key decryption threads, including selected first and second key decryption threads, for decrypting the first and second encrypted pre-master keys into respective first and second decrypted pre-master keys, and sending the decrypted pre-master keys to the driver for completing the initiating of the corresponding SSL sessions.

15. The method of claim 1, wherein the step (b) is performed in one of the following:
in parallel in multiple processors;
in parallel in multiple processor cores of a multiprocessor host.

16. The method of claim 1 wherein the step (a2) comprises:
starting a decryption request reader thread in the key agent, for acquiring the decryption request records stored in the decryption request queue of the driver;
creating a virtual SSL request device interface in the driver, for use by the key agent in accessing the decryption request queue;
sending a read command from the decryption request reader thread to the virtual SSL request device;
responding in the SSL request device after said corresponding decryption request record is placed in the decryption request queue;
sending said corresponding decryption request record from the decryption request queue to the decryption request reader thread; and
placing, by the decryption request reader thread, said corresponding decryption request record in the agent request queue.

17. The method of claim 7, wherein the step (b) further comprises:
selecting one of the plurality of key decryption threads;
sending the decryption request record from the agent request queue to the selected key decryption thread; and
decrypting the encrypted pre-master key of the decryption request record in the selected key decryption thread in the user mode.

18. The system of claim 13, wherein the means for initiating comprise a multiprocessor host having multiple processors or a computer having multiple processor cores for distributing the plurality of key decryption threads among the multiple processors or the multiple processor cores.

* * * * *